Aug. 14, 1945.  E. F. RIOPELLE ET AL  2,382,665
BALANCING MACHINE
Filed Dec. 14, 1942   3 Sheets-Sheet 2
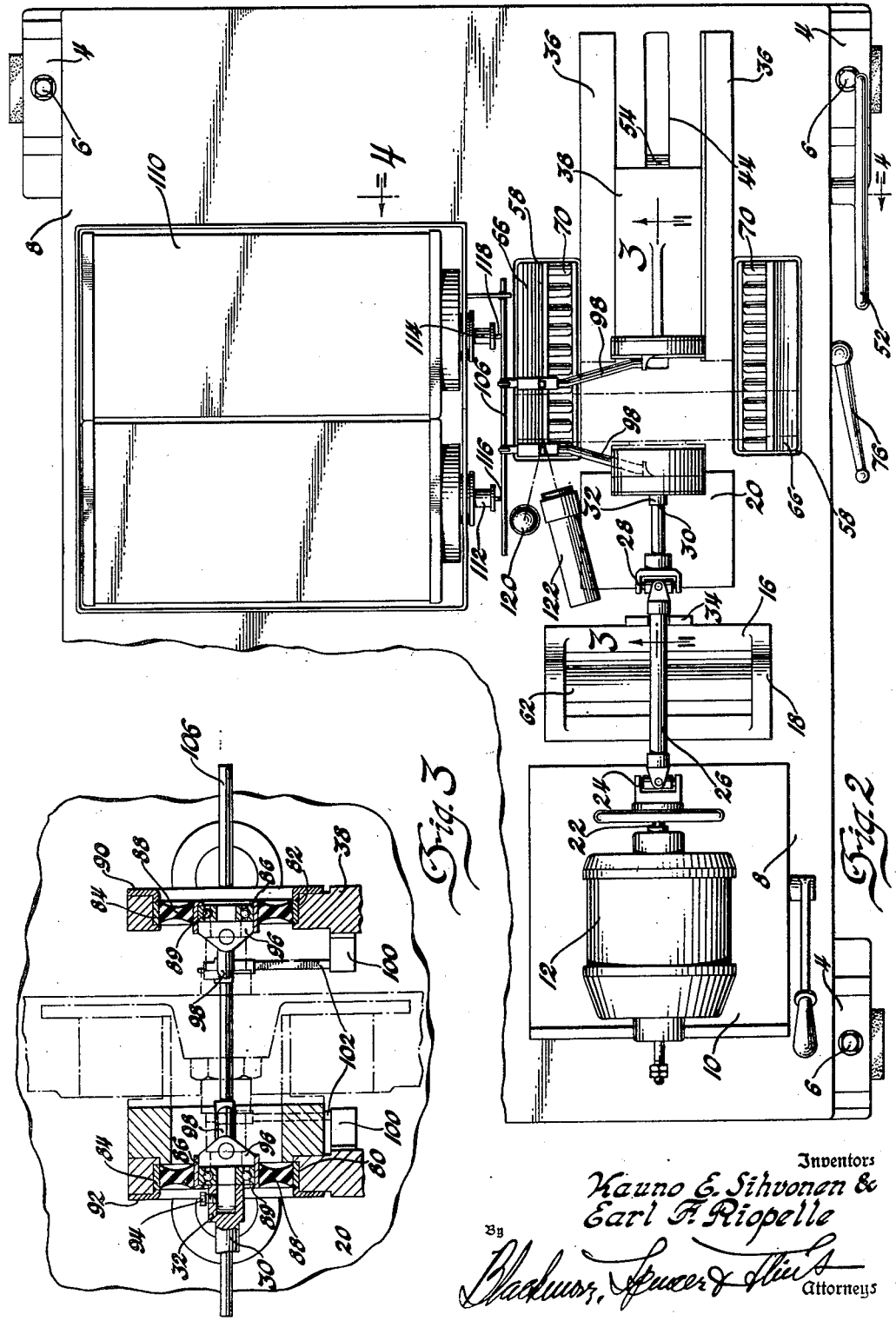
Inventors
Kauno E. Sihvonen &
Earl F. Riopelle
By Blackmore, Spencer & Flint
Attorneys Aug. 14, 1945.  E. F. RIOPELLE ET AL  2,382,665
BALANCING MACHINE
Filed Dec. 14, 1942    3 Sheets—Sheet 3

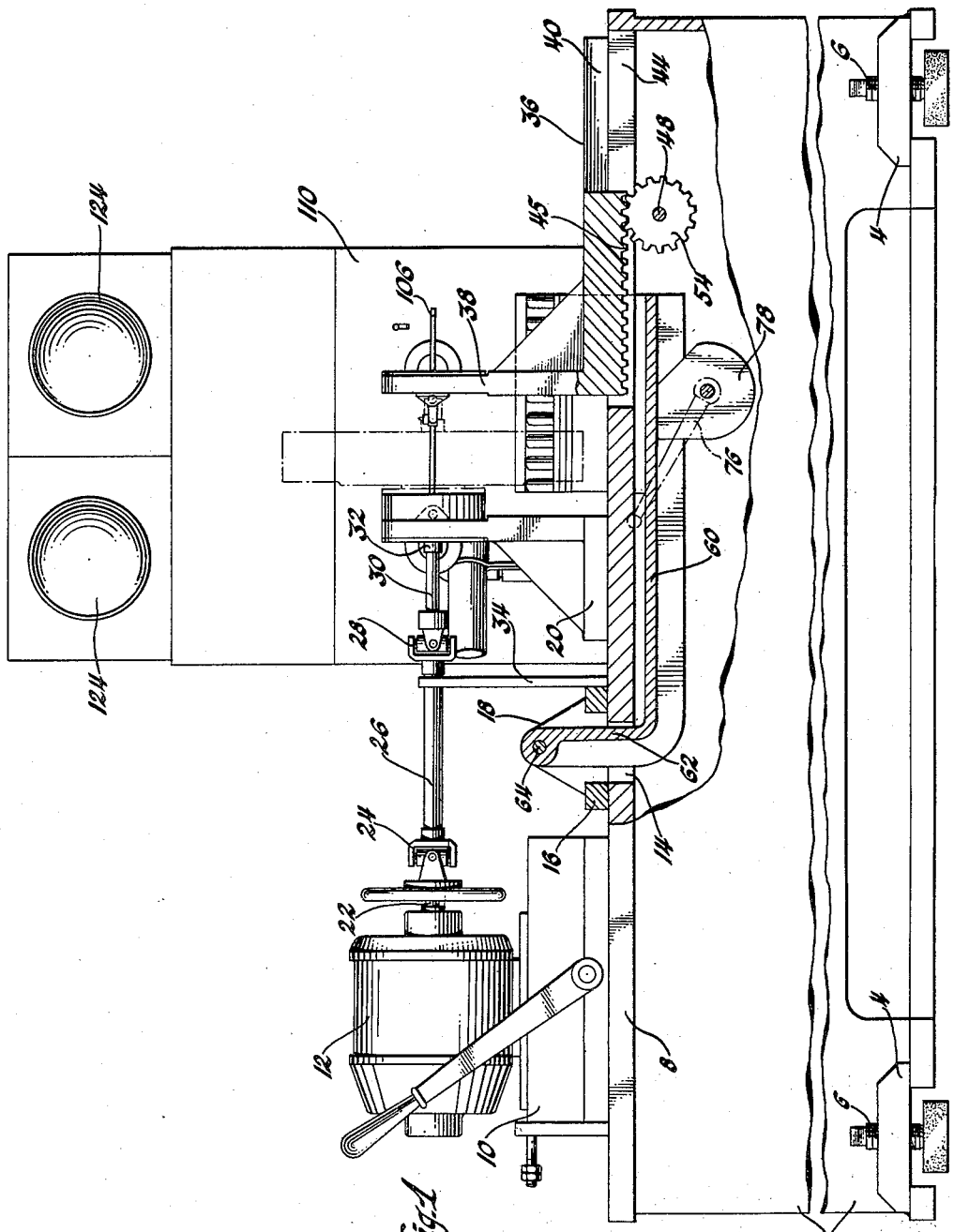

Inventors
Kauno E. Sihvonen &
Earl F. Riopelle
By
Blackmore, Spencer & Flint
Attorneys Patented Aug. 14, 1945

2,382,665

UNITED STATES PATENT OFFICE 2,382,665

BALANCING MACHINE

Earl F. Riopelle, Detroit, and Kauno E. Sihvonen, Dearborn, Mich., assignors to General Motors Corporation, Detroit, Mich., a corporation of Delaware Application December 14, 1942, Serial No. 468,878

5 Claims. (Cl. 73—66)

This invention relates to means for balancing and more specifically to means for balancing rotating parts at their normal speed of rotation.

It is of course well known that to balance a body about a point when it is at rest is not sufficient if that body in its normal use is to be in movement or rotation about a certain axis. There are dynamic forces that act to establish vibration or other unsatisfactory forces that occur when the body is put in motion, though it may have been perfectly balanced about its axis statically. This is especially true when the rotative speeds become high as they are frequently in modern apparatus.

It is therefore an object of our invention to provide balancing means for balancing rotative bodies at their normal speeds of use.

It is a still further object of our invention to provide dynamic balancing means to which the bodies may be applied easily and which can detect and locate unbalanced forces quickly and accurately.

With these and other objects in view which will become apparent as the specification proceeds, the embodiments of our invention will be best understood by reference to the following specification and claims and the illustrations in the accompanying drawings, in which:

Figure 1 is a side elevation of a machine embodying our invention, parts being broken away and shown in section.

Figure 2 is a top plan view of the mechanism;

Figure 3 is an enlarged sectional view through the means for supporting the rotating part taken on line 3—3 of Figure 2.

Figure 4:
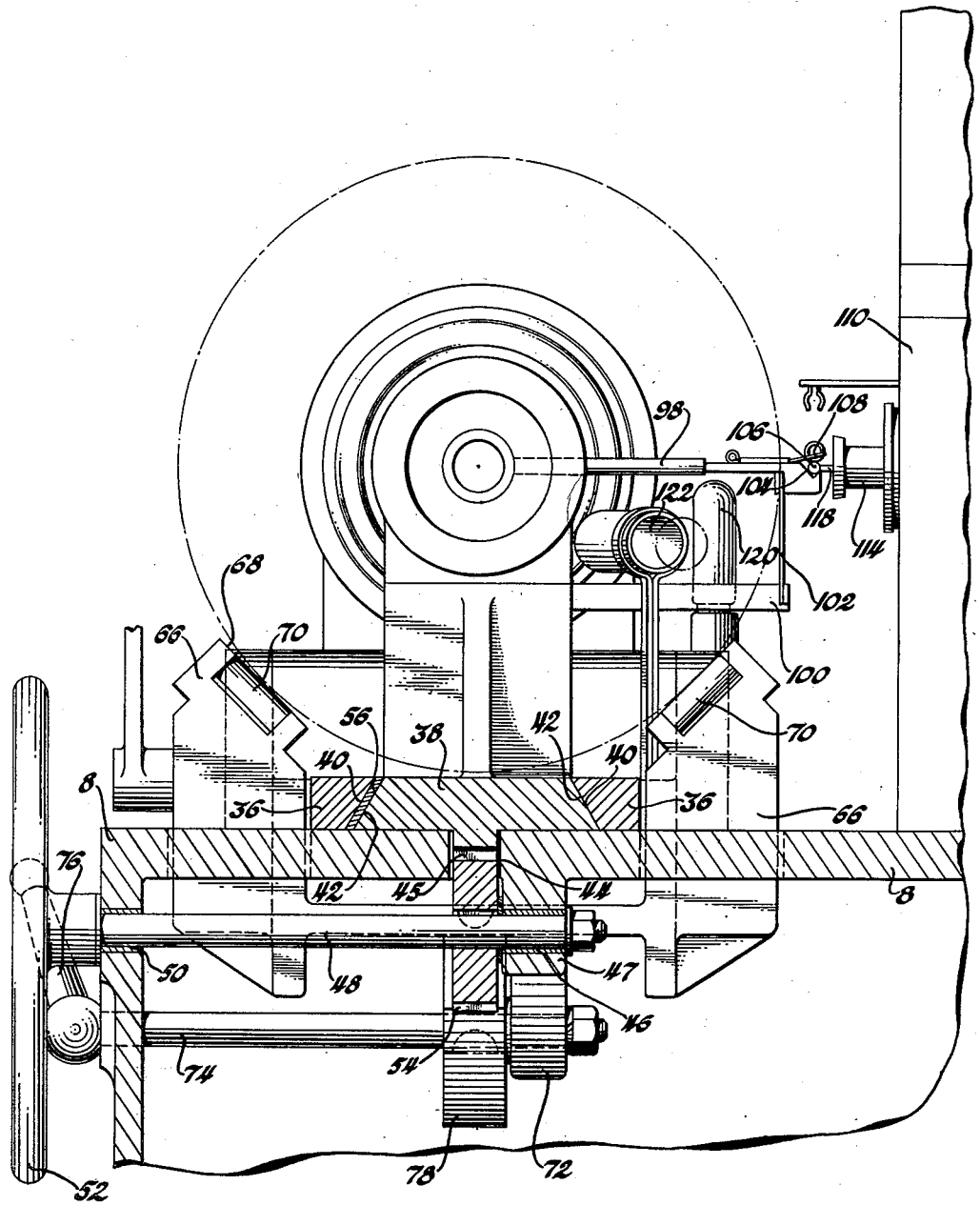
Figure 4 is a sectional view taken on the line 4—4 of Figure 2.

Referring now more specifically to the drawings, there is illustrated in Figure 1 a base member 2 having feet 4, each of which carries a leveling screw 6 therein to adjust and level the base in operating position. The base has a top 8 upon one end of which is mounted a block 10 for adjustably securing a driving motor 12. A transverse slot 14 is cut in the top and adjacent this slot upon the top is secured a rectangular open frame 16 having upwardly extending ears 18.

An angle bracket 20 is rigidly secured to the top adjacent the member 16 which acts to support the bearing members for one side of the rotatable test piece. To the motor shaft 22 is secured a universal joint 24 the opposite side of which is attached to a drive shaft 26 extending to a second universal joint 28 and a second drive shaft 30 which has applied to its end a hollow cup member 32 of the approximate dimension of the shaft of the test rotor. A vertical bearing member 34 projects up from the top 8 to support the shaft 26.

Mounted upon the top 8 are two parallel spaced tracks 36 which act as guides for the movable or adjustable bracket bearing member 38 which moves between them. The track members 36 are tapered as at 40 on the sides which face each other so that the upper distance between the two is less than the lower distance. The sides of the bracket that fit between the tracks also has tapered mating sides 42 which hold the bracket down upon the base.

Midway between the tracks and parallel therewith there is a slot 44 in the top 8 and the central portion of the lower face of the bracket 38 is provided with rack teeth 45 which extend down into this slot. An integral projecting lug 47 is located on the lower face of the top 8 and has an opening 46 therein which acts as a bearing for a rotatable shaft 48 which projects therethrough. This shaft also projects through an opening 50 in the front plate of the base and a hand wheel 52 is applied to its outer end to turn the same. Mounted on this shaft immediately below the rack teeth is a spur gear 54 which is adapted to mesh therewith. Thus when the hand wheel 52 is turned the bracket 38 will be moved back and forth between the track members. On the inner face 40 of one of the track members is secured a strip of friction material 56 to prevent too free slippage.

A pair of rectangular openings 58 are cut in the top 8 on opposite sides of the brackets 20 and 38. Mounted below the top 8 and substantially parallel thereto is a plate 60 having an upturned end portion 62 which extends up through the opening 14 and has a shaft 64 extending therethrough. This shaft also projects through openings in the ears 18 and thus pivotally mounts the plate about this shaft.

Integral with the pivoted plate 60 are two parallel upstanding portions 66 on opposite sides and extending up through the openings 58 in the top plate 8. Each of these portions 66 terminates in a slanting upper surface 68 in which are mounted a plurality of rollers 70. These roller surfaces are inclined toward each other and provide a cradle to support a work piece to be mounted in the machine. Rotatably mounted in a second projecting lug 72 is a shaft 74 which extends through the front plate of the base and has secured thereto an operating lever 76. Mounted on this shaft below the plate 60 is a cam 78 which supports the pivoted plate and which by turning causes the plate to assume different positions raising and lowering the same and the cradle.

Each of the angle brackets 20 and 38 are adapted to support the test piece or rotor in rotating position which supporting structure is best shown in Figure 3. There is provided in the upper end of each bracket aligned circular openings 80 and 82 having portions of different diameter, the portions of larger diameter being on the outer side or away from the rotor. A resilient supporting bearing is mounted in each of the openings and consists of an outer ring 84 and an inner ring 86 which are connected together by a torus 88 of resilient construction such as neoprene, which is strong and yet has a certain amount of resilience. Mounted within each of the inner rings 86 is a ball race assembly 89. Securing each of the supporting bearing assemblies in place in the openings 80 and 82 are flanged rings 90 and 92. The shaft of the rotatable test body is adapted to be trunnioned in these bearings and one end projects through into the coupling member 32 where it is secured by set screw 94 so that the motor 12 may rotate the rotor.

Each of the inner rings 86 carries a flange 96 to which is secured a motion-transmitting rod 98. A spaced supporting arm 100 extends outwardly from each bracket 20 and 38 under the rods 98 and each has a vertical member 102 which holds the outer end of each rod up but does not prevent transverse movement of the rod. In the end of each rod there is a notch 104 in which lies a transverse nodal bar 106, the bar being retained therein by springs 108. Thus any vibration of the rotor when it is rotating at full speed will move the bearings and this movement will be transmitted to the nodal bar by the rods.

A large panel 110 mounted on the back of the base houses the pick-up and indicating apparatus such as two voltage generating pick-up means 112 and 114 which are operated by contact rods 116 and 118 extending to touch the nodal bar. These pick-up devices may be of various forms such as electromagnetic, quartz crystal or similar devices. Mounted also upon the top 8 are a source of light 122 and a photoelectric cell 120, the latter being so directed as to receive reflected light from the periphery of the rotor, the latter having a spot on the surface to alter the flow of light and thus provide an angular index of the unbalanced force.

In the operation of the machine the handwheel 52 is rotated in a clockwise direction looking from the front which moves the bracket member 38 to the right. The lever 76 is also rotated clockwise until it is in the position shown in Figure 1 at which time the cam 78 is supporting the plate in its upper position. The rotor is then placed between the two brackets with its periphery resting on the rollers 70 which brings its shaft into alignment with the bearings 89. The rotor is pushed to the left and rolls on the rollers until the shaft extends through the left hand bearing and into the coupler 32 where it is clamped. Handwheel 52 is now turned counterclockwise which moves the right hand bracket toward the rotor until the rotor shaft extends through its bearing 89. Lever 76 is then forced down which drops plate 60 and the cradle away from the rotor, the latter now being entirely supported by the bearings. The nodal bar is then snapped into the supporting notches in the rods and the contact rods adjusted against it. The motor 12 is energized and rotates the rotor at its rated speed. Any vibration due to unbalanced forces in the rotor will be transferred to the nodal bar and pick-up means the output of each of which is then connected to the vertical plates of a conventional cathode ray tube oscillograph 124 to provide vertical deflection proportional to the vibration. The output of the photocell 122 is also applied to the cathode ray tubes to initiate the sweep circuit to give an angular index indication.

When the rotor has been tested the cradle is again brought up to contact the periphery thereof and support it while the right hand bearing bracket is backed away to allow the rotor to be removed.

We claim:

1. In a balancing machine, a base, a vertical bracket fixedly supported on the base, a second vertical bracket slidably mounted on the base, a series of rack teeth on the lower face of the second bracket, a manually rotatable gear engaging with the rack teeth to cause the bracket to be moved back and forth, aligned bearing members carried by the brackets and adapted to support a test rotor, a pivoted plate mounted below the top of the base and having portions extending up on both sides of the brackets, rollers carried by these portions to engage the rotor periphery and allow the same to be easily moved axially for insertion in the bearing members, and means for lowering the plate when the rotor is in its proper position.

2. In a balancing machine, a base, a vertical bracket fixedly supported on the base, a second vertical bracket slidably mounted on the base, a series of rack teeth on the lower face of the second bracket, a manually rotatable gear engaging with the rack teeth to cause the bracket to be moved back and forth, aligned bearing members carried by the brackets and adapted to support a test rotor, a pivoted plate mounted below the top of the base and having portions extending up on both sides of the brackets, rollers carried by these portions to engage the rotor periphery and allow the same to be easily moved axially for insertion in the bearing members, a rotatable cam mounted below and contacting the plate having flat supporting surfaces of different radii whereby the plate will be supported at different heights as the cam is turned.

3. In a balancing machine, a base, a plurality of vertical bearing brackets mounted on said base and relatively movable with respect to each other, pivoted supporting means mounted below the top of the base and having portions extending up on both sides of the brackets to support a rotor to be tested until the brackets have been properly positioned and means to pivotally adjust the supporting means to disengage the rotor.

4. In a balancing machine, a base, a vertical bracket fixedly supported on the base, a second vertical bracket slidably mounted on the base, a series of rack teeth on the lower face of the second bracket, a manually rotatable gear engaging with the rack teeth to cause the bracket to be moved back and forth, aligned bearing members carried by the brackets and adapted to support a test rotor, a pivoted plate mounted below the top of the base and having portions extending up on both sides of the brackets to support the rotor for mounting in the bearings and means to support said pivoted plate in a plurality of different angular positions.

5. In a balancing machine, a base, a vertical bracket fixedly supported on the base, a second vertical bracket slidably mounted on the base, a series of rack teeth on the lower face of the second bracket, a manually rotatable gear engaging with the rack teeth to cause the bracket to be moved back and forth, aligned bearing members carried by the brackets and adapted to support a test rotor, a pivoted plate mounted below the top of the base and having portions extending up on both sides of the brackets to support the rotor for mounting in the bearings and means for rotating said plate around its pivot to release the rotor periphery from contact therewith.

EARL F. RIOPELLE.
KAUNO E. SIHVONEN.